US010575147B1

(12) United States Patent
Cansino et al.

(10) Patent No.: US 10,575,147 B1
(45) Date of Patent: *Feb. 25, 2020

(54) METHOD AND SYSTEM FOR DETERMINING A LOCATION OF A MOBILE DEVICE AND UTILIZING THE LOCATION IN CONTENT SERVICES

(71) Applicant: The DIRECTV Group, Inc., El Segundo, CA (US)

(72) Inventors: Don E. Cansino, Redondo Beach, CA (US); Pankaj Sharma, Buena Park, CA (US); Brady C. Tsurutani, Los Angeles, CA (US); Yeung Chan, Rancho Palos Verdes, CA (US); Mark A. Shurgot, Los Angeles, CA (US); Dien Nguyen, Torrance, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/296,914

(22) Filed: Mar. 8, 2019

Related U.S. Application Data

(63) Continuation of application No. 15/620,879, filed on Jun. 13, 2017, now Pat. No. 10,285,018, which is a
(Continued)

(51) Int. Cl.
*H04W 4/30* (2018.01)
*H04L 29/08* (2006.01)
(Continued)

(52) U.S. Cl.
CPC .......... *H04W 4/30* (2018.02); *G06Q 30/0261* (2013.01); *H04H 60/15* (2013.01);
(Continued)

(58) Field of Classification Search
CPC .......... H04N 21/454; H04N 21/45457; H04N 21/458; H04N 21/462; H04N 21/4622;
(Continued)

(56) References Cited

U.S. PATENT DOCUMENTS 5,565,909 A 10/1996 Thibadeau et al.
5,636,245 A 6/1997 Ernst et al.
(Continued)

FOREIGN PATENT DOCUMENTS

FR 2789246 A1 8/2000
GB 2344009 A 5/2000
WO WO-0190859 A1 11/2001

OTHER PUBLICATIONS

Zhang, et al., "Secure Localization in Wireless Sensor Networks", IEEE Military Communications Conference; Oct. 2005; pp. 3169-3175; vol. 5.
(Continued)

*Primary Examiner* — George Eng
*Assistant Examiner* — Hung K Du
(74) *Attorney, Agent, or Firm* — Harness, Dickey & Pierce, P.L.C.

(57) ABSTRACT

A system and method for controlling a mobile device at a headend includes the mobile device communicating a request for content to the headend. The headend requests geographic coordinate location data from the mobile device and, when geographic coordinate data is available, determines a first geographic region associated with the mobile device in response to the geographic coordinate location data. When geographic coordinate data is not available from the mobile device, the headend extracts an IP address from the request and determines a second geographic region based on the IP address and a confidence level. When the confidence level is below a threshold, the headend deter-
(Continued)

mines a third geographic region based on subscriber data for the mobile device. The headend controls the mobile device in response to one of the first geographic region, the second geographic region and the third geographic region.

20 Claims, 6 Drawing Sheets

Related U.S. Application Data continuation of application No. 13/223,101, filed on Aug. 31, 2011, now abandoned.

(51) Int. Cl.
| | | |
|---|---|---|
| H04H 60/51 | (2008.01) | |
| H04N 21/643 | (2011.01) | |
| G06Q 30/02 | (2012.01) | |
| H04W 4/021 | (2018.01) | |
| H04N 21/454 | (2011.01) | |
| H04N 21/81 | (2011.01) | |
| H04H 60/15 | (2008.01) | |
| H04H 60/66 | (2008.01) | |
| H04N 21/258 | (2011.01) | |
| H04N 21/45 | (2011.01) | |

(52) U.S. Cl.
CPC ............ *H04H 60/51* (2013.01); *H04H 60/66* (2013.01); *H04L 67/18* (2013.01); *H04N 21/25841* (2013.01); *H04N 21/454* (2013.01); *H04N 21/4524* (2013.01); *H04N 21/64322* (2013.01); *H04N 21/812* (2013.01); *H04W 4/021* (2013.01); *H04L 67/20* (2013.01)

(58) Field of Classification Search
CPC ........... H04N 21/64322; H04N 21/812; H04N 21/25841; H04N 21/4524; H04W 4/30; H04W 4/021; H04L 67/18; H04L 67/20; H04H 60/15; H04H 60/51; H04H 60/66; G06Q 30/0261
See application file for complete search history.

(56) References Cited

U.S. PATENT DOCUMENTS

| | | |
|---|---|---|
| 5,664,948 A | 9/1997 | Dimitriadis et al. |
| 5,838,277 A | 11/1998 | Loomis et al. |
| 6,115,667 A | 9/2000 | Nakamura |
| 6,334,059 B1 | 12/2001 | Stilp et al. |
| 6,529,742 B1 | 3/2003 | Yang |
| 6,552,661 B1 | 4/2003 | Lastinger et al. |
| 6,571,096 B2 | 5/2003 | Plunkett |
| 6,785,551 B1 | 8/2004 | Richard |
| 6,968,206 B1 | 11/2005 | Whitsey-Anderson |
| 7,034,695 B2 | 4/2006 | Troxler |
| 7,107,046 B1 | 9/2006 | Mainard et al. |
| 7,164,986 B2 | 1/2007 | Humphries et al. |
| 7,370,343 B1 * | 5/2008 | Ellis ................... H04N 5/44543 725/58 |
| 7,486,943 B2 | 2/2009 | Choti et al. |
| 2002/0042276 A1 | 4/2002 | Hakalin et al. |
| 2002/0060747 A1 | 5/2002 | Nonomura |
| 2002/0072361 A1 | 6/2002 | Knoblach et al. |
| 2002/0161633 A1 | 10/2002 | Jacob et al. |
| 2002/0167442 A1 | 11/2002 | Taylor |
| 2005/0186931 A1 | 8/2005 | Laiho et al. |
| 2006/0128397 A1 * | 6/2006 | Choti ................. G06Q 10/0875 455/456.1 |
| 2008/0039008 A1 | 2/2008 | Chen et al. |
| 2008/0222705 A1 | 9/2008 | Goodmon et al. |
| 2009/0006190 A1 | 1/2009 | Lucash et al. |
| 2009/0248663 A1 * | 10/2009 | Maniyar ............. G06F 16/9537 |
| 2009/0327354 A1 | 12/2009 | Resnick et al. |
| 2010/0175116 A1 | 7/2010 | Gum |
| 2010/0304664 A1 | 12/2010 | Littlejohn et al. |
| 2011/0041147 A1 * | 2/2011 | Piepenbrink ........ H04N 7/17336 725/28 |
| 2011/0055866 A1 | 3/2011 | Piepenbrink et al. |
| 2013/0018581 A1 | 1/2013 | Sidhu et al. |
| 2013/0217408 A1 | 8/2013 | DiFazio et al. |
| 2017/0280300 A1 * | 9/2017 | Cansino ............. G06Q 30/0261 |

OTHER PUBLICATIONS

International Search Report and Written Opinion dated in Inernational Application No. US2012/046078 filed Jul. 10, 2012 by Don E. Cansino et al.

\* cited by examiner

METHOD AND SYSTEM FOR DETERMINING A LOCATION OF A MOBILE DEVICE AND UTILIZING THE LOCATION IN CONTENT SERVICES

CROSS-REFERENCE TO RELATED APPLICATION

This application is a continuation of U.S. patent application Ser. No. 15/620,879, filed on Jun. 13, 2017 and claims priority to U.S. patent application Ser. No. 13/223,101, filed on Aug. 31, 2011. The entire disclosure of the above application is incorporated herein by reference.

TECHNICAL FIELD

The present disclosure relates generally a video content delivery system, and, more specifically, to using the location of the device in the content delivery process.

BACKGROUND

The statements in this section merely provide background information related to the present disclosure and may not constitute prior art.

Television content providers are continually increasing the amount of television content provided. Mobile devices such as touch-screen mobile devices have also increased in popularity. Such devices are typically connectable to the internet to obtain content from various sources. Mobile touch-screen devices include the iPad® by Apple and various Android operating system devices. Mobile phones are other types of phones used for obtaining content from various sources. Content may be provided to the mobile devices from a headend through the internet.

Sporting events are one such event that may be provided to a mobile device. One example of a sporting event is a football game. During sporting events, a game may be blacked out in a certain area or areas due to contractual limitations with sports leagues. For example, local stations may not be able to carry a football game if all the tickets are not sold for a particular game.

One example of a service that provides access to a sporting event is the NFL Sunday Ticket® To-Go provided by DIRECTV®. This package allows authorized users to obtain all the National Football League® games on a mobile device. Even though the customers receive the content on their mobile devices, the contractual limitations for preventing geographic access must be enforced.

SUMMARY

The present disclosure provides a system and method for determining the location of a mobile device. The location may be used to enforce contractual blackout obligations for sporting events. The location information may also be used for providing directed advertising based upon the location of the mobile device.

In one aspect of the disclosure, a method includes communicating a request for content from a mobile device to a headend, requesting geographic coordinate location data from the mobile device and when geographic coordinate data is available, determining geographic coordinate location data at the mobile device, communicating the geographic coordinate location data to the headend, and determining a first geographic region associated with the mobile device in response to the geographic coordinate location data. The method also includes, when geographic coordinate data is not available from the mobile device, extracting an IP address from the request, and determining a second geographic region based on the IP address and a confidence level. The method also includes, when the confidence level is below a threshold, determining a third geographic region based on subscriber data for the mobile device, and controlling the mobile device in response to one of the first geographic region, the second geographic region and the third geographic region.

In a further aspect of the disclosure, a system and method for controlling a mobile device at a headend includes the mobile device communicating a request for content to the headend. The headend requests geographic coordinate location data from the mobile device and, when geographic coordinate data is available, determines a first geographic region associated with the mobile device in response to the geographic coordinate location data. When geographic coordinate data is not available from the mobile device, the headend extracts an IP address from the request and determines a second geographic region based on the IP address and a confidence level. When the confidence level is below a threshold, the headend determines a third geographic region based on subscriber data for the mobile device. The headend controls the mobile device in response to one of the first geographic region, the second geographic region and the third geographic region.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
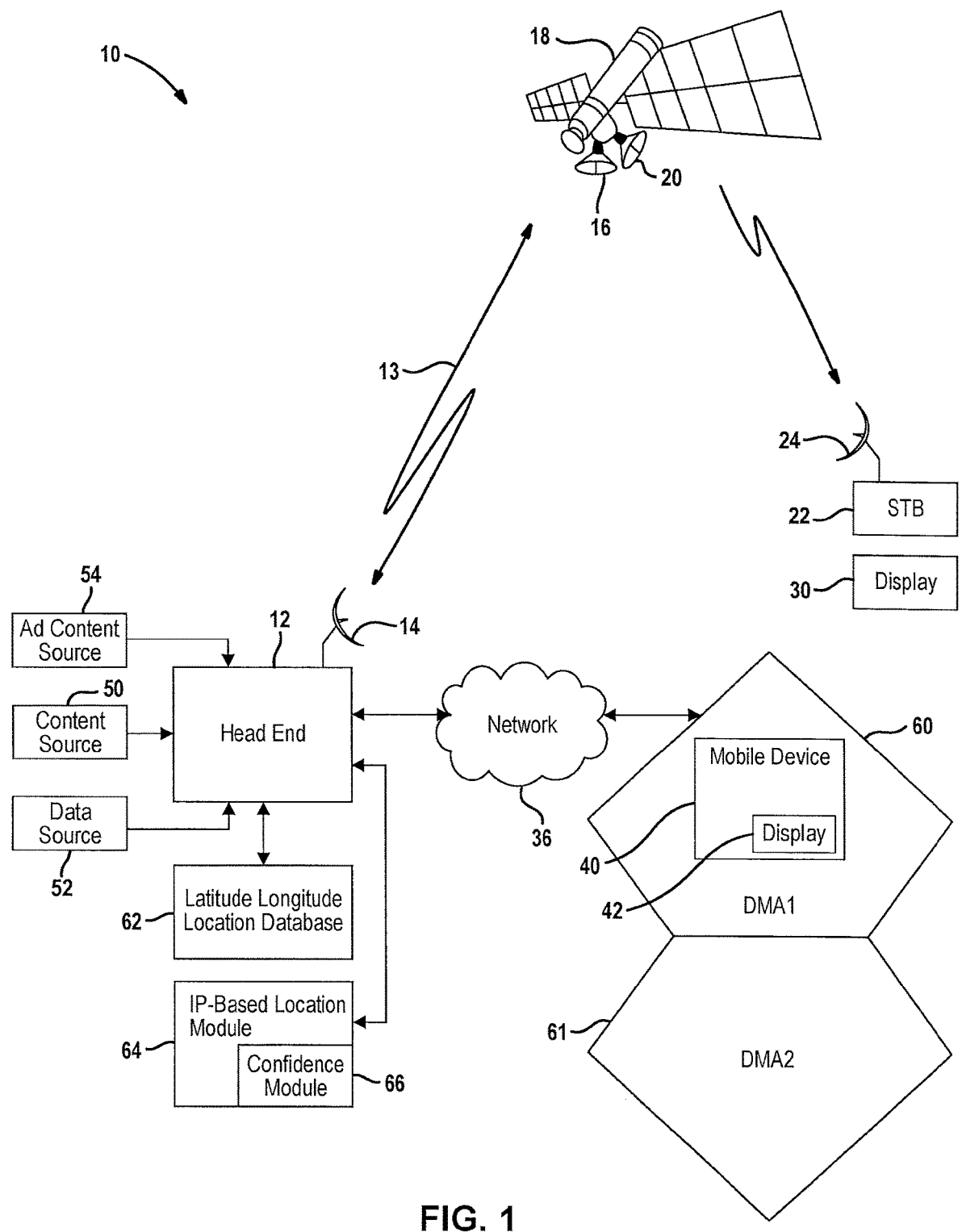
FIG. 1 is a high-level block diagrammatic view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to the delivery of content (e.g., live or recorded television (TV), movies, games, music videos, etc.), it should be understood that the systems and methods disclosed herein could also be used for delivery of any media content type, for example, audio, music, data files, web pages, games, etc. Additionally, throughout this disclosure reference is made to programs, data, information, movies, assets, video data, etc., however, it will be readily apparent to persons of ordinary skill in the art that these terms are substantially equivalent in reference to the example systems and/or methods disclosed herein. As used herein, the term title or program will be used to refer to the movie or program name.

Referring now to FIG. 1, a content communication system 10 is illustrated. The content communication system 10 includes a headend 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. A set top box 22 is an example of a stationary receiving system that may be placed at different locations relative to the display or television. The set top box 22 is in communication with an antenna 24. The antenna 24 receives downlink signals 26 from the transmitting antenna 20 of the satellite 18.

The headend 12 may communicate various content, program guide data or other data through the satellite 18. The set top box 22 may receive the content and data. A plurality of set top boxes 22 may be provided in a system. The plurality of set top boxes 22 may be located within a single building or household.

The set top box or boxes 22 each have a display 30 associated therewith. The display 30 may be a television or monitor used for displaying video images and providing an audio output.

A network 36 may be used to connect the headend with various device included the set top box 22. The network 36 may be one type of network or multiple types of networks. The network 36 may, for example, be a public switch to telephone network, the internet, a mobile telephone network or other type of network.

The system 10 may also include a mobile device 40. The mobile device 40 may be various types of devices including a mobile phone, a laptop, or a touch screen device or computer. The mobile device 40 may have a screen display 42 used for displaying various types of information as will be set forth further below.

The mobile device 40 may be capable of receiving content through the network 36. The network 36 may be used to transmit the same content to the mobile device as the set top box. The mobile device 40 may provide a primary or secondary means for receiving content data. That is, the same content may be provided to both the set top box 22 and the mobile device 40. This may be done with different formatting.

The headend 12 may receive various content from a content source 50. The content source 50 provides live video and audio feeds from live sporting events or other types of events. The content source 50 may also provide recorded content.

A data source 52 may provide data to the headend 12. The data may include blackout data for determining whether a particular device should be blacked out of a particular broadcasted signal. That is, blackout data may include designated marketing area data that corresponds to geographic regions or designated marketing areas that should not be receiving a particular event (blacked out).

An advertising (ad) source 54 may also be provided in the system. The ad source 54 may provide advertising and associated advertising data to the headend 12. The ad source 54 may also provide ads that are location-specific. That is, data associated with an advertisement may indicate that the ad is available for a particular geographic region.

The mobile device 40 is illustrated within a designated marketing area 60. The designated marketing area 60 may be adjacent to one or more designated marketing areas 61. A designated marketing area is a geographical area or region defined by a fixed closed boundary. Typically, a household may belong to one designated marketing area. The designated marketing area may have a plurality of postal or zip codes associated therewith. Generally, a designated marketing area is a geographic region where the population can receive the same television and radio station offerings.

The headend 12 may also be in communication with a latitude and longitude-based location database 62. The latitude and longitude-based location database 62 may be used to determine a geographic region such as a designated marketing area, zip code and country from received location data. The received location data may be received from a mobile device 40 through the headend 12 as will be described further below. The received location data may be a geographic coordinate. Based upon the latitude and longitude coordinates, the geographic region such as country and zip code may be determined and return to the headend from the latitude and longitude-based location database 62.

An internet protocol-(IP) based location module 64 may also be used to provide location data to the headend 12. The IP-based location module 64 may receive an IP address as location data from the mobile device 40 through the headend 12. The IP-based location module 64 may generate a geographic region such as the zip code, DMA and/or country of the location of the mobile device 40. The IP-based location determination may not be as precise as a geographic coordinate obtained above. The IP-based location module 64 may also include a confidence module 66. The confidence module 66 may assign confidence data to the IP-based location data provided to the headend. As will be described below, the headend 12 may choose to ignore the IP-based location data when the confidence data indicates that confidence levels are low. When the confidence data indicates the confidence levels are high, the headend may choose to accept the location of the mobile device as determined by the IP-based location module 64.

Figure 2:
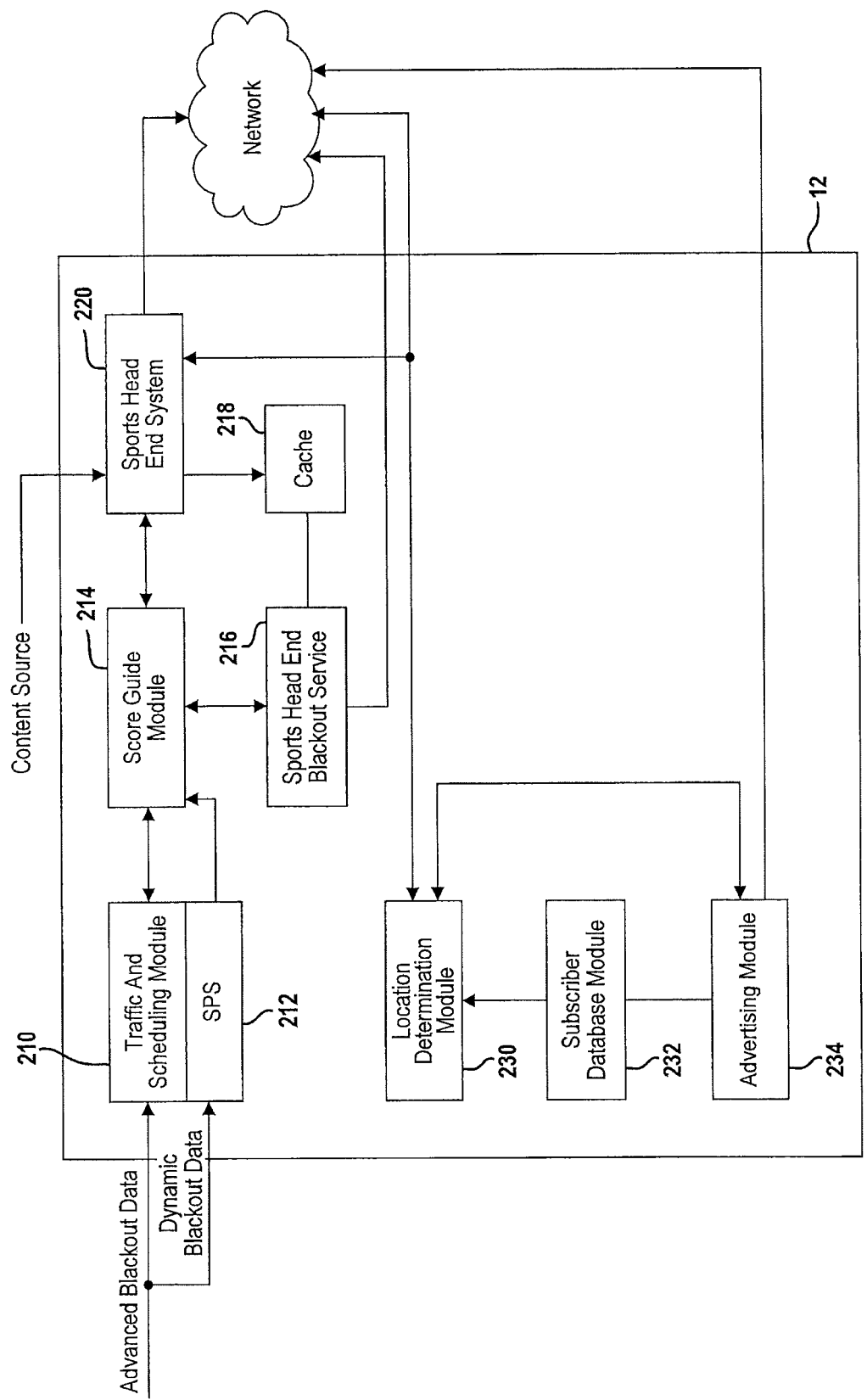
FIG. 2 is a block diagrammatic view of the headend according to FIG. 1.

Referring now to FIG. 2, the headend 12 is illustrated in further detail. The headend 12 may include a traffic and scheduling module 210. The traffic and scheduling module 210 may receive blackout data from the data source 52 illustrated in FIG. 1. The blackout data may be provided on a periodic basis such as on a daily basis. This data is provided in advance and thus may be referred to as advanced data. The dynamic blackout data may also be provided to the headend as needed. Advanced blackout data may be provided daily for the known schedule for the day. In this manner, the advanced blackout data may be processed well in advance of the program's broadcasting time. Dynamic blackout data may be received for last-minute changes. The quantity of data is relatively small compared to the daily update. Dynamic blackout data may be provided to update the advanced blackout data when needed including up to the time of, or during, a blacked out event. The traffic and scheduling module 210 may receive the advanced blackout data. The dynamic blackout data may be received by the scheduled pad (program-associated data) server module (SPS) 212. The SPS module 212 and traffic and scheduling module may be one module or separate modules. In a sporting context, the traffic and scheduling module 210 and the SPS 212 may provide the blackout data to a score guide module 214. The SPS 212 may inform the score guide module 214 that updates are available using a notification signal. The score guide module 214 may retrieve the blackout data from the traffic and scheduling module 210 on a regular basis such as daily or in response to the notification signal.

The score guide module 214 may also retrieve game-related data and associates the game-related data with the data extracted from the traffic and scheduling module 210. The game-related data may include, but is not limited to, teams, scores, timeframe (inning, period, quarter), players, statistics and the like.

A sports headend blackout service 216 may be used to extract blackout data from the score guide module 214 on a periodic basis such as once a minute. The sports headend blackout service 216 may store the blackout data in a cache 218 for easy access when a blackout determination is made.

A sports headend system 220 may be used to broadcast or communicate the content or content stream from the content source to the mobile device 40 illustrated in FIG. 1. The sports headend system 220 may receive a request for content from the mobile device and determine a location of the mobile device from the location determination module 230. The sports headend system 220 may stream content to a particular mobile device or group of mobile devices based on an identifier of the mobile device.

The location determination module 230 may communicate a geographic region of the mobile device to the sports headend system 220 where a decision may be made as to whether the content from the content source should be blacked out according to blackout rules associated with the requested content. Details of determining a geographic location are described below.

The location determination module 230 may include a subscriber database module 232 for communicating subscriber data thereto. The subscriber database module 232 together with the location determination module 230 may provide identifier data to the sports headend system 220.

An advertising module 234 may also be incorporated into the system. The advertising module 234 may use location data from the location determination module 230 to determine whether the mobile device should receive advertising data based upon the location of the mobile receiving device. In either case, the location or geographic region may be determined in a similar manner. However, the geographic region may also be used differently for determining blackouts and determining advertising. Advertising may be suitable for various zip codes which may be more specific than a designated marketing area. Thus, zip codes or postal codes within a designated marketing area or not relative to the designated marketing area may be used to determine the proper location-specific advertisements in a geographical manner. The country may also be determined in a sports setting. Thus, content users outside of a country may not be able to receive the content being provided by the headend. The interaction of the components within the headend will be more thoroughly described below.

Figure 3:
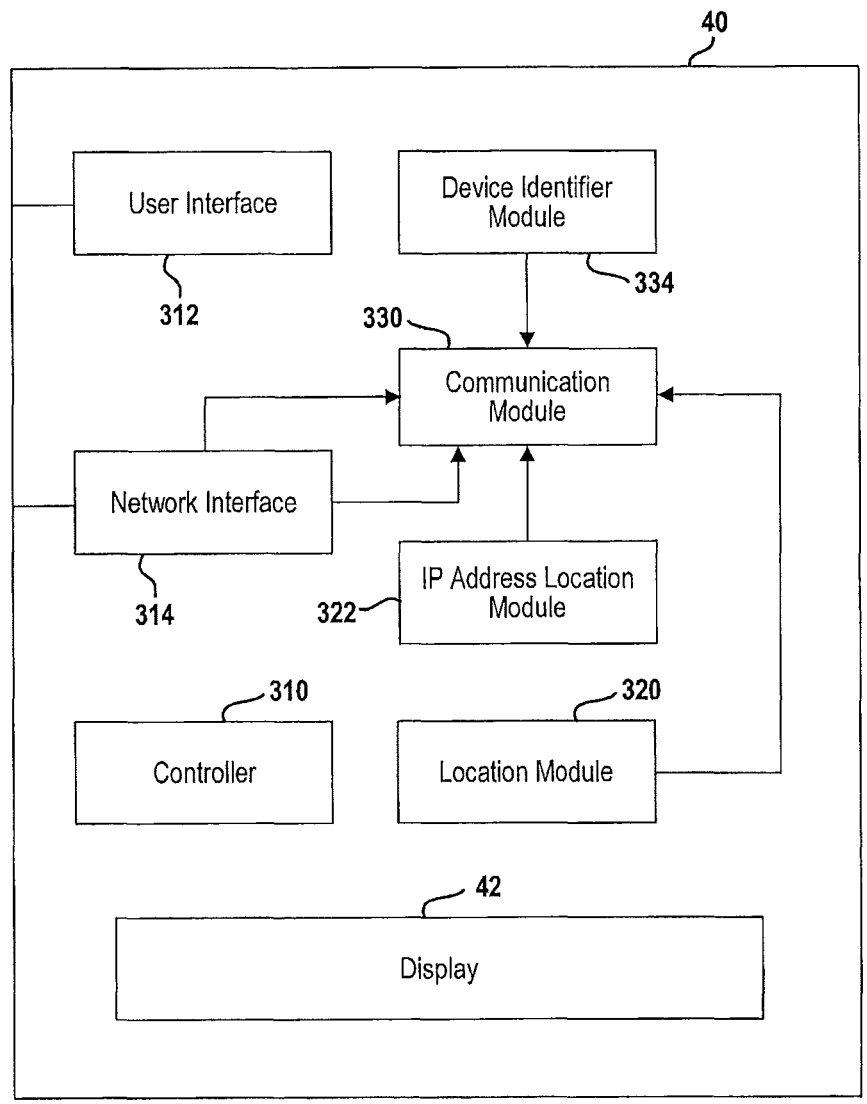
FIG. 3 is a block diagrammatic view of the mobile device of FIG. 1.

Referring now to FIG. 3, the mobile device 40 is illustrated in further detail. The mobile device 40 may be one of several different types of mobile devices including, but not limited to, a portable computer, a cellular phone, a tablet computer, a touch screen device, and a personal digital assistant. The mobile device 40 may include a controller 310 used to control the various components and interactions with external devices or systems. The controller 310 may be coupled to each of the components. For simplicity, the controller interconnections have not been illustrated. A user interface 312 may be provided at the mobile device 40. The user interface 312 may be an external device such as a remote control or another type of user interface such as a keyboard, buttons, touch screen or the like. The user interface allows the user of the mobile device 40 to select content and control the mobile device 40.

A network interface 314 may also be included within the device. The network interface 314 may be used to communicate with the headend 12 through the network 36 illustrated in FIG. 1.

The mobile device 40 may also include a location module 320. The location module 320 may be used to generate a location for the mobile device. The location module 320 may use global positioning satellites to determine a geographic or coordinate point such as latitude and longitude of the device. Many mobile phones use global positioning for determining the location of the mobile device to a high degree of accuracy. A geographic or coordinate point may also be determined by triangulation techniques using cellular phone systems.

An IP address location module 322 may generate IP address data corresponding to the IP address for the mobile device 40. Should a mobile device not include the capability for determining an exact location through GPS or cellular triangulation, the IP address location module 322 may use an IP address to determine a mobile device location.

A communication module 330 may receive the IP address data from the IP address location module 322 or the location data from the location module 320. Communication module 330 may communicate with the network 36 through the network interface module 314. The communication module 330 may generate a communication signal that includes the IP address data which is communicated through the network 36 to the headend 12. This may be performed after a request for data from the mobile device 40 is received. This may also be performed simultaneously with a request for data from the mobile device 40.

An identifier module 334 may provide a unique identifier for the mobile device. The device identifier may allow the headend 12 to identify the user and the account associated with the user. The device identifier may also be provided for communications to and from the headend 12 through the network.

Ultimately, the location data is used for controlling the mobile device. For example, the mobile device may be controlled in such a manner that location-specific advertising may be communicated to the mobile device specific that is suited for the geographic location of the mobile device. Further, the mobile device may be controlled in response to the blackout data to prevent the user from receiving or displaying content at the mobile device that is subject to a blackout.

Figure 4:
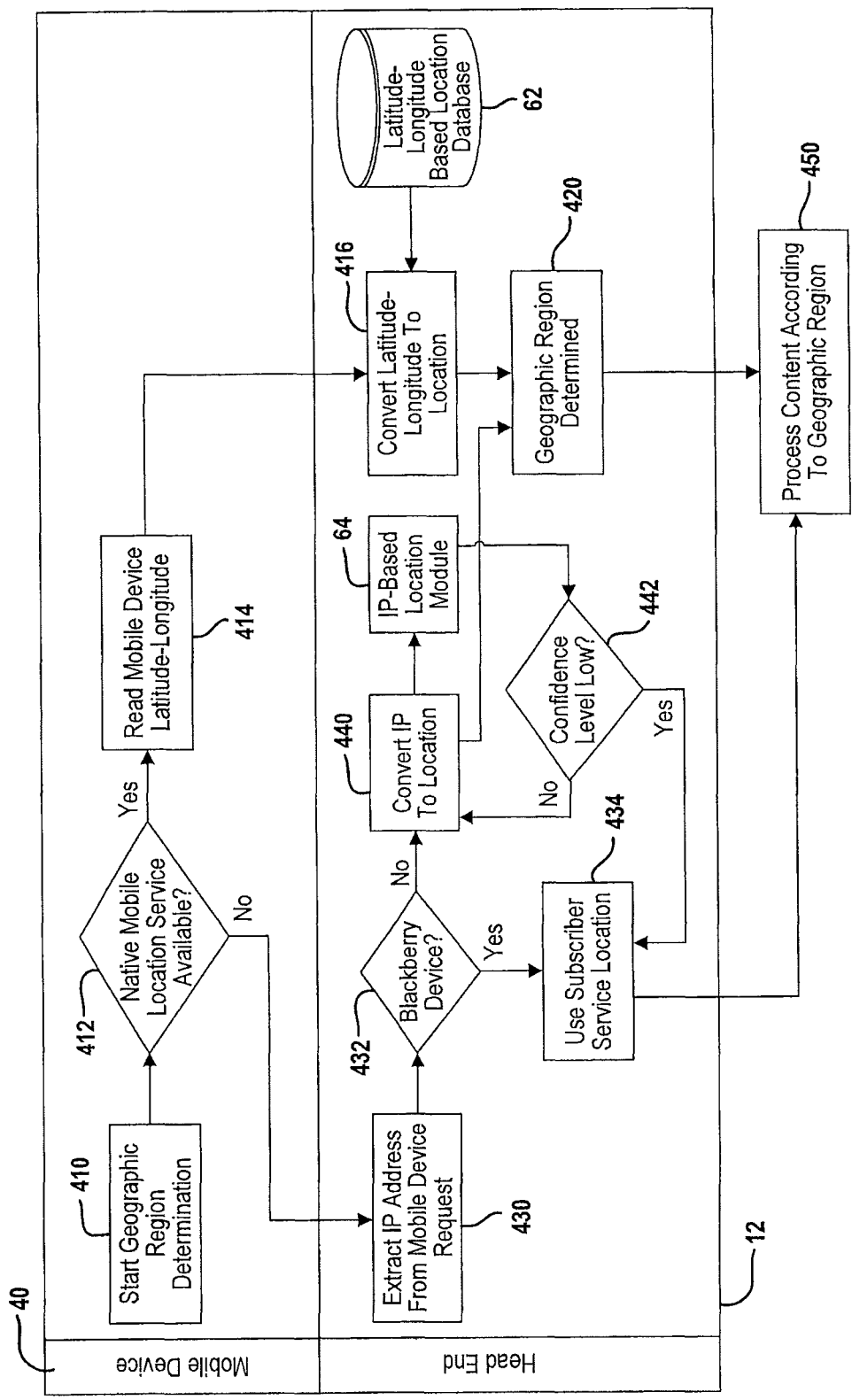
FIG. 4 is a flowchart of a method for determining the geo-location of a mobile device.

Referring now to FIG. 4, a method for determining a geographic region of the mobile device is set forth. The flowchart is illustrated with respect to the mobile device 40 and the headend 12. In step 410, the process for determining the location or geographic region of the mobile device is initiated. In step 412, if a native or geographic coordinate mobile location service is available, step 414 is used to read the latitude and longitude of the mobile device. Native or geographic coordinate mobile location service may be performed using a GPS system or a cellular telephone triangulation system. In step 416, the headend converts the latitude and longitude coordinates to a geographic region such as a designated marketing area, zip code and country using the latitude longitude location database 62. The geographic region is thus determined in step 420 based upon the database and the latitude and longitude data provided from the mobile device.

Referring back to step 412, when a native location service is not available step 430 extracts the IP address from the mobile device. The IP address may be obtained from the IP address of the request. Certain mobile devices may have various characteristics that may not allow the IP address that was extracted in step 430 to be used for determining a location. One such device is a Blackberry®. In step 432, it is determined whether the mobile device is a Blackberry® device. If the mobile device is a Blackberry® device step 434 uses the subscriber service location module to determine the subscriber location. That is, the mobile device may be identified and the account address associated with the account may be used. Thus, the subscriber service location may be used for the geographic region determined in step 420.

Referring back to step 432, when the device is not a Blackberry® device step 440 converts the IP address of the mobile device to a geographic region. This may be performed using the IP-based location module 64 illustrated in FIG. 1. Confidence data may also be returned with the IP-based location module data. The confidence level is compared to a threshold in step 442. When the confidence level is below the threshold in step 442, step 434 uses the subscriber data for determining the geographic region. When the confidence level is above the threshold in step 442, step 440 converts the data received from the IP-based location module 64 into a geographic region. This may be merely retrieving the data for the location from the signal communicated from the IP-based location module. After step 440, the geographic region is determined from the IP location in step 420. This may be finding a broader or larger area such as a designated marketing area that includes the originally determined location.

After step 420, the content is processed in step 450 in response to the geographic region. As described above, determining signals for a blackout or providing advertising data based on the geographic region may be performed as will be described below.

Figure 5:
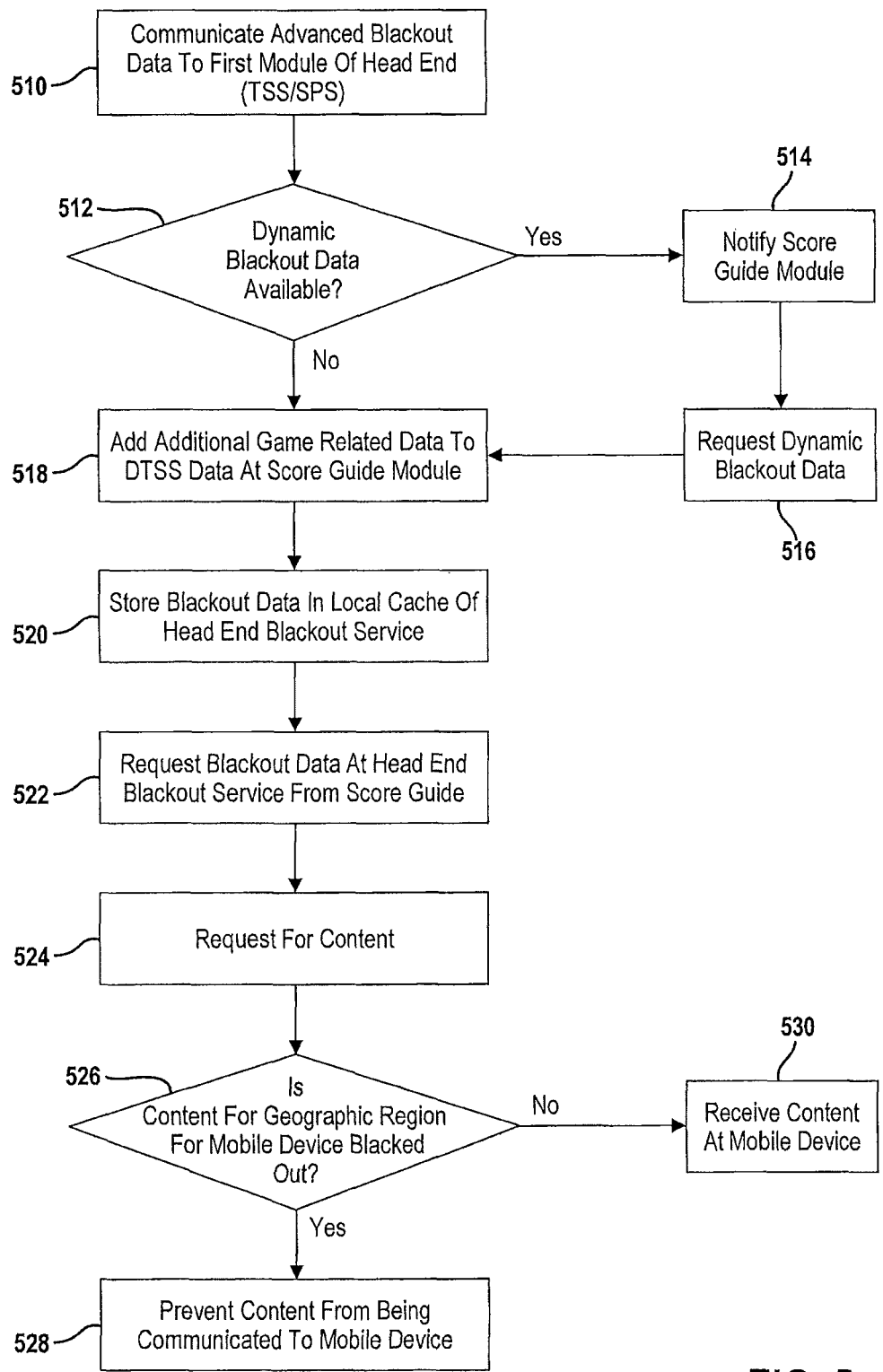
FIG. 5 is a flowchart of a method for blacking out a signal according to the location.

Referring now to FIG. 5, a method of performing content processing according to the geographic region is set forth. In step 510, advanced blackout data is communicated to the traffic and scheduling system and the scheduled PAD server (SPS) as described above. This may be performed in regular intervals such as daily. The blackout data may include designated marketing area data therein or other geographic location or region associated with the blackout. Dynamic updates may be received by the scheduled pad server (SPS) or traffic and scheduling module at various times throughout the day. In step 512, if dynamic data is available, step 514 notifies the score guide module within the headend using a notification signal. In step 516, the dynamic blackout data that was communicated to the scheduled program associated data server (SPS) 212 is requested by the score guide module using a request signal.

After a negative response in step 512 and after step 516, additional game-related data is communicated to the traffic and scheduling system at the score guide module in step 518.

In step 520, the blackout data and any additional data is stored in a local cache of the headend. In step 522, blackout data is requested at the sports headend blackout service from the score guide module.

In step 524, a request for content signal is received from the mobile device and processed according to FIG. 4 in which the geographic region is determined for the mobile device. In step 526, it is determined whether the content for the geographic region for the mobile device is blacked out. If the content should be blacked out, the content or content stream corresponding to the content request is not communicated to the mobile device in step 528. Further, step 528 may prevent the content from being received at the mobile device by controlling the mobile device.

In step 526, if the content is able to be received and not subject to blackout step 530 allows the content to be received at the mobile device.

Figure 6:
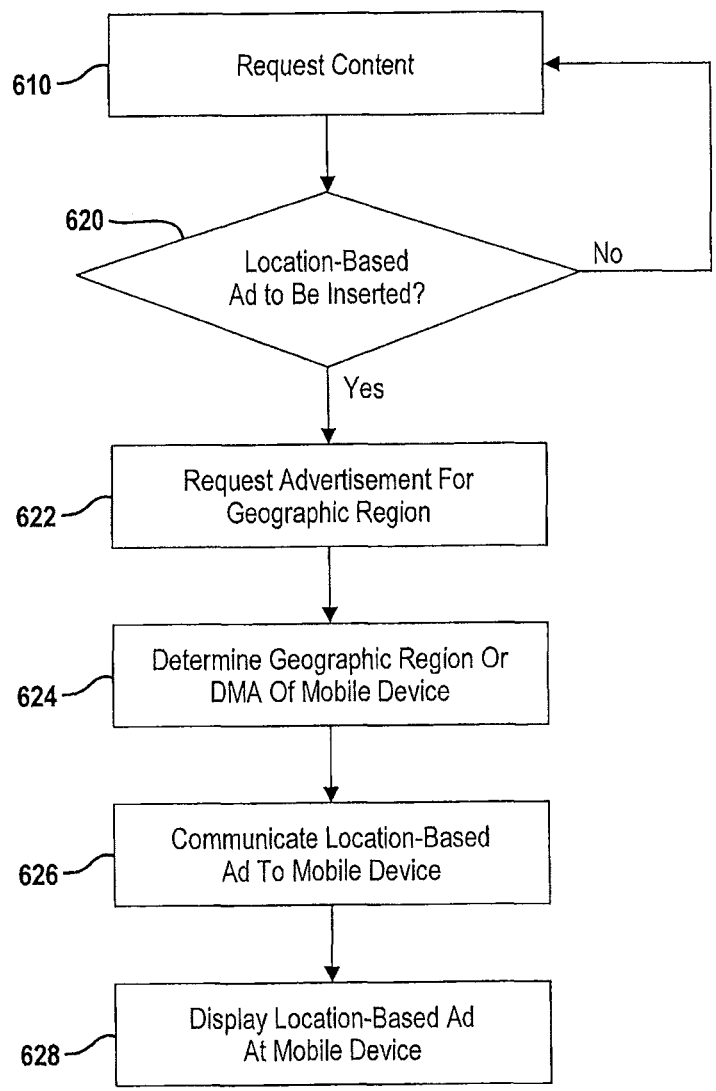
FIG. 6 is a flowchart of a method for generating a location-based advertisement.

Referring now to FIG. 6, a method for inserting a location-based advertisement is set forth. In step 610, the content is requested from the mobile device using a content request signal. During playback a location-based advertisement may be inserted at a particular time in step 620. A location-based ad is requested by the mobile device from the headend. The request may include the latitude and longitude as well as a mobile device identifier (e.g., IP address). In step 624, the geographic region or the designated marketing area of the mobile device is determined at the headend. This may be performed according to FIG. 4. In step 626, a location-based advertisement is located within the headend and is communicated to the mobile device which corresponds to the geographic region of the mobile device. The location-based advertisement may be communicated with the content corresponding to the request. Time codes or markers may indicate the location for the location-based ad to be inserted. In step 628, the location-based advertisement is received and displayed at the mobile device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method for blacking out a content stream to a mobile device comprising:
    receiving advanced blackout data once during an update period and dynamic blackout data more than once during the update period;
    receiving a request for content at a content source from the mobile device;
    determining a geographic region for the mobile device; and
    after determining the geographic region, preventing communication of the content stream to the mobile device in response the geographic region.

2. The method as recited in claim 1 further comprising receiving a blackout data notification signal at the content source and requesting, by the content source, dynamic blackout data.

3. A method of controlling a content stream based on a geographic region associated with a mobile device comprising:
    receiving, at a content source, a request for content from the mobile device;
    determining a geographic region for the mobile device;

receiving, at the content source, advanced blackout data from a content provider once during an update period;

after receiving the advanced blackout data, receiving, at a communication module of the content source, a notification signal for dynamic blackout data;

requesting, by the content source, the dynamic blackout data in response to the notification signal;

receiving, at the content source, the dynamic blackout data from the content provider in response to requesting the dynamic blackout data, the dynamic blackout data received at least twice for every update period; and preventing communication of the content stream to the mobile device in response the geographic region.

4. The method as recited in claim 3 wherein receiving the advanced blackout data comprises periodically receiving the advanced blackout data at a scheduling system location of the content source.

5. The method as recited in claim 4 further comprising communicating the advanced blackout data from the scheduling system to a program data server within the content source.

6. The method as recited in claim 5 further comprising in response to receiving the dynamic blackout data, communicating the notification signal to the program data server.

7. The method as recited in claim 6 further comprising retrieving, by the program data server, the dynamic blackout data from the scheduling system.

8. The method as recited in claim 3 further comprising communicating location-based advertising to the mobile device.

9. The method as recited in claim 3 wherein determining the geographic region is IP-based.

10. The method as recited in claim 3 wherein determining the geographic region is IP-based and performed within the content source when a confidence level is above a threshold.

11. The method as recited in claim 3 wherein determining the geographic region is IP-based and performed within the content source when a confidence level is below a threshold.

12. The method as recited in claim 3 wherein determining the geographic region is performed by a native location service associated with the mobile device.

13. A system for controlling a content stream based on a geographic region associated with a mobile device comprising:

a head end receiving a request for content from the mobile device;

the head end, determining a geographic region for the mobile device;

the head end receiving advanced blackout data from a content provider once during an update period;

the head end, after receiving the advanced blackout data, receiving a notification signal for dynamic blackout data;

the head end requesting, the dynamic blackout data in response to the notification signal;

the head end receiving the dynamic blackout data from a content source in response to requesting the dynamic blackout data more than once during the update period; and the head end preventing communication of the content stream to the mobile device in response to the geographic region and one of the advanced blackout data or the dynamic blackout data.

14. The system as recited in claim 13 wherein the advanced blackout data comprises advanced blackout data received on a periodic basis.

15. The system as recited in claim 13 wherein the head end receives the advanced blackout data at a scheduling system within the head end.

16. The system as recited in claim 15 wherein the communication module communicates the advanced blackout data from the scheduling system location to a program data server within the head end.

17. The system as recited in claim 16 wherein the head end communicates the notification signal to the program data server in response to receiving the dynamic blackout data in response to the notification signal.

18. The system as recited in claim 17 wherein the program data server retrieves the dynamic blackout data from the scheduling system in response to the notification signal.

19. The system as recited in claim 18 wherein the head end retrieves the advanced blackout data and the dynamic blackout data from program data server location and wherein the head end controls the mobile device in response to the blackout data.

20. The system as recited in claim 13 wherein the head end controls the mobile device by communicating location-based advertising to the mobile device.

* * * * *